US012094298B2

(12) United States Patent
Tam et al.

(10) Patent No.: US 12,094,298 B2
(45) Date of Patent: Sep. 17, 2024

(54) ELECTRONIC GAMING MACHINE AND METHOD FOR HOLDING DESIGNATED SYMBOLS DURING A WAGERING GAME AND INCREMENTALLY INCREASING A MULTIPLIER

(71) Applicant: Aristocrat Technologies Australia Pty Limited, North Ryde (AU)

(72) Inventors: Billy Tam, Lindfield (AU); Lipi Gupta, Newington (AU); Matthew Chan, Gordon (AU); Hiram Yu, Mortdale (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 590 days.

(21) Appl. No.: 17/209,059

(22) Filed: Mar. 22, 2021

(65) Prior Publication Data
US 2021/0209898 A1 Jul. 8, 2021

Related U.S. Application Data

(63) Continuation of application No. 16/538,441, filed on Aug. 12, 2019, now Pat. No. 10,957,155.

(30) Foreign Application Priority Data

Aug. 13, 2018 (AU) .............................. 2018902953
Jun. 26, 2019 (AU) .............................. 2019204528

(51) Int. Cl.
*G07F 17/32* (2006.01)
*G06F 7/58* (2006.01)
*G07F 17/34* (2006.01)

(52) U.S. Cl.
CPC ............ *G07F 17/3244* (2013.01); *G06F 7/58* (2013.01); *G07F 17/3213* (2013.01);
(Continued)

(58) Field of Classification Search
CPC .. G07F 17/32; G07F 17/3213; G07F 17/3225; G07F 17/3227; G07F 17/3244;
(Continued)

(56) References Cited

U.S. PATENT DOCUMENTS 6,375,570 B1 * 4/2002 Poole .................. G07F 17/3211
463/31
10,078,942 B2 * 9/2018 Suda .................... G07F 17/3213
(Continued)

FOREIGN PATENT DOCUMENTS

AU    2017235939 A1    5/2018

OTHER PUBLICATIONS

Office Action dated Jul. 10, 2020 for U.S. Appl. No. 16/538,441 (pp. 1-17).
(Continued)

*Primary Examiner* — Milap Shah
(74) *Attorney, Agent, or Firm* — Armstrong Teasdale LLP

(57) ABSTRACT

An electronic gaming machine includes a processor configured to control a display device to display a plurality of columns of symbol positions, where each symbol position includes a symbol selected from a set of symbols. The processor is also configured to determine whether any of the symbol positions include a designated symbol, and if so, to: i) control the display device to hold the designated symbol in the symbol position for at least one subsequent game instance of a series of game instances, and ii) increase a multiplier used in determining a game award from a first multiplier to a second, larger, multiplier. The processor is also configured to evaluate the symbols included in each symbol position to determine whether a winning combination of symbols is displayed. If a winning combination of
(Continued)

symbols is displayed, the processor also calculates a game award using one of the first multiplier or the second multiplier.

20 Claims, 12 Drawing Sheets

(52) U.S. Cl.
CPC ...... *G07F 17/3225* (2013.01); *G07F 17/3267* (2013.01); *G07F 17/34* (2013.01)

(58) Field of Classification Search
CPC ............... G07F 17/326; G07F 17/3265; G07F 17/3267; G07F 17/34
See application file for complete search history.

(56) References Cited

U.S. PATENT DOCUMENTS

| | | | | |
|---|---|---|---|---|
| 10,685,530 | B2* | 6/2020 | Wortmann | G07F 17/3213 |
| 2003/0054872 | A1 | 3/2003 | Locke | |
| 2004/0038731 | A1 | 2/2004 | Englman | |
| 2004/0053666 | A1* | 3/2004 | Vancura | G07F 17/32 |
| | | | | 463/16 |
| 2005/0070354 | A1* | 3/2005 | Baerlocher | G07F 17/3267 |
| | | | | 463/20 |
| 2006/0058097 | A1* | 3/2006 | Berman | G07F 17/3213 |
| | | | | 463/20 |
| 2009/0111557 | A1 | 4/2009 | Jankowski | |
| 2009/0227356 | A1 | 9/2009 | Moroney | |
| 2010/0075737 | A1 | 3/2010 | Bluemel | |
| 2010/0124969 | A1* | 5/2010 | Hughes | G07F 17/3213 |
| | | | | 463/20 |
| 2011/0244935 | A1 | 10/2011 | Matthews | |
| 2012/0083327 | A1* | 4/2012 | Zobel | G07F 17/3213 |
| | | | | 463/20 |
| 2013/0065662 | A1 | 3/2013 | Watkins | |
| 2014/0113703 | A1 | 4/2014 | Bigelow, Jr. | |
| 2014/0256402 | A1* | 9/2014 | Caputo | G07F 17/3267 |
| | | | | 463/20 |
| 2014/0274287 | A1* | 9/2014 | Suda | G07F 17/3213 |
| | | | | 463/20 |
| 2015/0287269 | A1* | 10/2015 | Berman | G07F 17/326 |
| | | | | 463/20 |
| 2015/0339880 | A1* | 11/2015 | Zurawski | G07F 17/34 |
| | | | | 463/20 |
| 2015/0348374 | A1* | 12/2015 | Dupuis | G07F 17/34 |
| | | | | 463/20 |
| 2016/0063804 | A1 | 3/2016 | Cuddy | |
| 2016/0078711 | A1* | 3/2016 | Rucker | G07F 17/34 |
| | | | | 463/21 |
| 2016/0180637 | A1 | 6/2016 | Honeycutt | |
| 2016/0328926 | A1 | 11/2016 | Boese | |
| 2017/0024970 | A1* | 1/2017 | Sherrets | G07F 17/3267 |
| 2017/0084113 | A1 | 3/2017 | Sanders | |
| 2018/0075692 | A1* | 3/2018 | Hirai | G07F 17/3209 |

OTHER PUBLICATIONS

Notice of Allowance dated Nov. 27, 2020 for U.S. Appl. No. 16/538,441 (pp. 1-7).
Australian Examination Report No. 1 issued in App. No. AU2019204528, dated May 31, 2024, 9 pages.

* cited by examiner

| Reel position | Reel 1 | Reel 2 | Reel 3 | Reel 4 | Reel 5 |
|---|---|---|---|---|---|
| 1 | Pic 1 | 10 | Pic 3 | Q | Pic 1 |
| 2 | Wild | Q | K | A | 10 |
| 3 | J | K | 10 | 10 | A |
| 4 | Q | A | Q | Pic 2 | Pic 2 |
| 5 | 10 | Pic 2 | K | J | Q |
| 6 | A | 9 | Pic 1 | Wild | Q |
| 7 | Pic 2 | Wild | J | 9 | K |
| 8 | A | Pic 3 | K | 10 | Pic 2 |
| 9 | Q | Q | 9 | A | 9 |
| 10 | K | 10 | Q | Q | Wild |
| 11 | J | A | 10 | J | 9 |
| 12 | 10 | J | Wild | K | Q |
| 13 | Pi | | A | Wild | 10 |
| 14 | | | A | Pic 3 | Wild |
| 15 | | | Wild | Pic 1 | A |

ELECTRONIC GAMING MACHINE AND METHOD FOR HOLDING DESIGNATED SYMBOLS DURING A WAGERING GAME AND INCREMENTALLY INCREASING A MULTIPLIER

CROSS-REFERENCE TO RELATED APPLICATIONS

This application is a continuation application from U.S. patent application Ser. No. 16/538,441, filed Aug. 12, 2019, and entitled ELECTRONIC GAMING MACHINE AND METHOD FOR HOLDING DESIGNATED SYMBOLS DURING A WAGERING GAME AND INCREMENTALLY INCREASING A MULTIPLIER, which claims priority to Australian Patent Application Serial No. 2019204528, filed Jun. 26, 2019 and entitled A GAMING DEVICE, which claims priority to Australian Provisional Patent Application Serial No. 2018902953, filed Aug. 13, 2018, and entitled A GAMING DEVICE, each of which are incorporated by reference herein in their entirety.

FIELD

The present application relates to electronic gaming, and more particularly to systems and method of electronic gaming, in which one or more designated symbols may be held in place when they appear within an array of symbol positions, and in which a multiplier used to calculate a game award may be incrementally increased each time one or more such designated symbols appear within the array.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

In an embodiment of the invention, the gaming device is configured such that when a series of free games are carried out, when a wild symbol forms part of a winning combination, the reel strip corresponding the winning combination is held in place for future free games and a multiplier that applies to winning combinations incorporating wild symbols is incremented such that as more wild symbols are held a larger multiplier applies.

An embodiment provides a gaming device comprising a display, a processor, and a memory storing a) a set of symbols including at least one designated symbol, and b) instructions. When the instructions are executed by the processor, cause the processor to initiate a series of game instances, and, in each game instance display a plurality of columns of symbol positions, select symbols from the set of symbols for each symbol position not occupied by a previously held symbol, and control the display to display the selected symbols and any previously held symbols. Upon the selected symbols including a designated symbol, the instructions cause the processor to hold the designated symbol in place at a respective symbol position for any subsequent game instance of the series, and increment a multiplier to apply to evaluation of winning combinations provided a maximum multiplier has not been reached. The instructions cause the processor evaluate the displayed symbols for winning combinations, and determine a quantum of each award for a winning combination in accordance the current multiplier.

Another embodiment provides a method of operating a gaming device comprising a display. The method comprises initiating a series of game instances, and in each game instance, displaying a plurality of columns of symbol positions on a display of the gaming device, selecting symbols from the set of symbols for each symbol position not occupied by a previously held symbol, and controlling the display to display the selected symbols and any previously held symbols. Upon the selected symbols including a designated symbol, holding the designated symbol in place at a respective symbol position for any subsequent game instance of the series, and incrementing a multiplier to apply to evaluation of winning combinations provided a maximum multiplier has not been reached. The method also involves evaluating the displayed symbols for winning combinations, and determining a quantum of each award for a winning combination in accordance the current multiplier.

Another embodiment provides a gaming system comprising a display, one or more processors, and at least one memory storing instructions. When executed by the one or more processors, the instructions cause the one or more processors to initiate a series of game instances, and, in each game instance display a plurality of columns of symbol positions, select symbols from the set of symbols for each symbol position not occupied by a previously held symbol, and control the display to display the selected symbols and any previously held symbols. Upon the selected symbols including a designated symbol, the instructions cause the processor to hold the designated symbol in place at a respective symbol position for any subsequent game instance of the series, and increment a multiplier to apply to evaluation of winning combinations provided a maximum multiplier has not been reached. The instructions cause the processor evaluate the displayed symbols for winning combinations, and determine a quantum of each award for a winning combination in accordance the current multiplier.

In some aspects, an embodiment provides an electronic gaming machine. The electronic gaming machine includes a display device, a memory, and a processor. The processor is configured to execute instructions stored in the memory, which when executed, cause the processor to at least: control the display device to display a plurality of columns of symbol positions, each symbol position including a symbol selected from a set of symbols; determine whether any of the symbol positions of the plurality of columns of symbol positions include a designated symbol; in response to determining that a symbol position includes the designated symbol: i) control the display device to hold the designated symbol in the symbol position for at least one subsequent game instance of a series of game instances, and ii) increase a multiplier used in determining a game award from a first multiplier to a second, larger, multiplier; evaluate the symbols included in each symbol position to determine whether a winning combination of symbols is displayed; and in response to a winning combination of symbols being displayed, calculate a game award using one of the first multiplier or the second multiplier.

In some aspects, an embodiment provides a tangible, non-transitory, computer-readable storage medium. The computer-readable storage medium has instructions stored thereon, which when executed by a processor, cause the processor to at least: control a display device to display a plurality of columns of symbol positions, each symbol position including a symbol selected from a set of symbols; determine whether any of the symbol positions of the plurality of columns of symbol positions include a designated symbol; in response to determining that a symbol position includes the designated symbol: i) control the display device to hold the designated symbol in the symbol position for at least one subsequent game instance of a series of game instances, and ii) change a multiplier used in calculating a game award; determine whether to provide the game award; and in response to determining to provide the game award, calculate the game award using the changed multiplier.

In some aspects, an embodiment provides a method. The method includes: controlling, by a processor, a display device to display a plurality of columns of symbol positions, each symbol position including a symbol selected from a set of symbols; determining, by the processor, whether any of the symbol positions of the plurality of columns of symbol positions include a designated symbol; in response to determining that a symbol position includes the designated symbol: i) controlling, by the processor, the display device to hold the designated symbol in the symbol position for at least one subsequent game instance of a series of game instances, and ii) incrementing, by the processor, a multiplier used in calculating a game award; determining, by the processor, whether to provide the game award; and in response to determining to provide the game award, calculating, by the processor, the game award using one of a previous multiplier or the increased multiplier.

DETAILED DESCRIPTION

Figure 1:
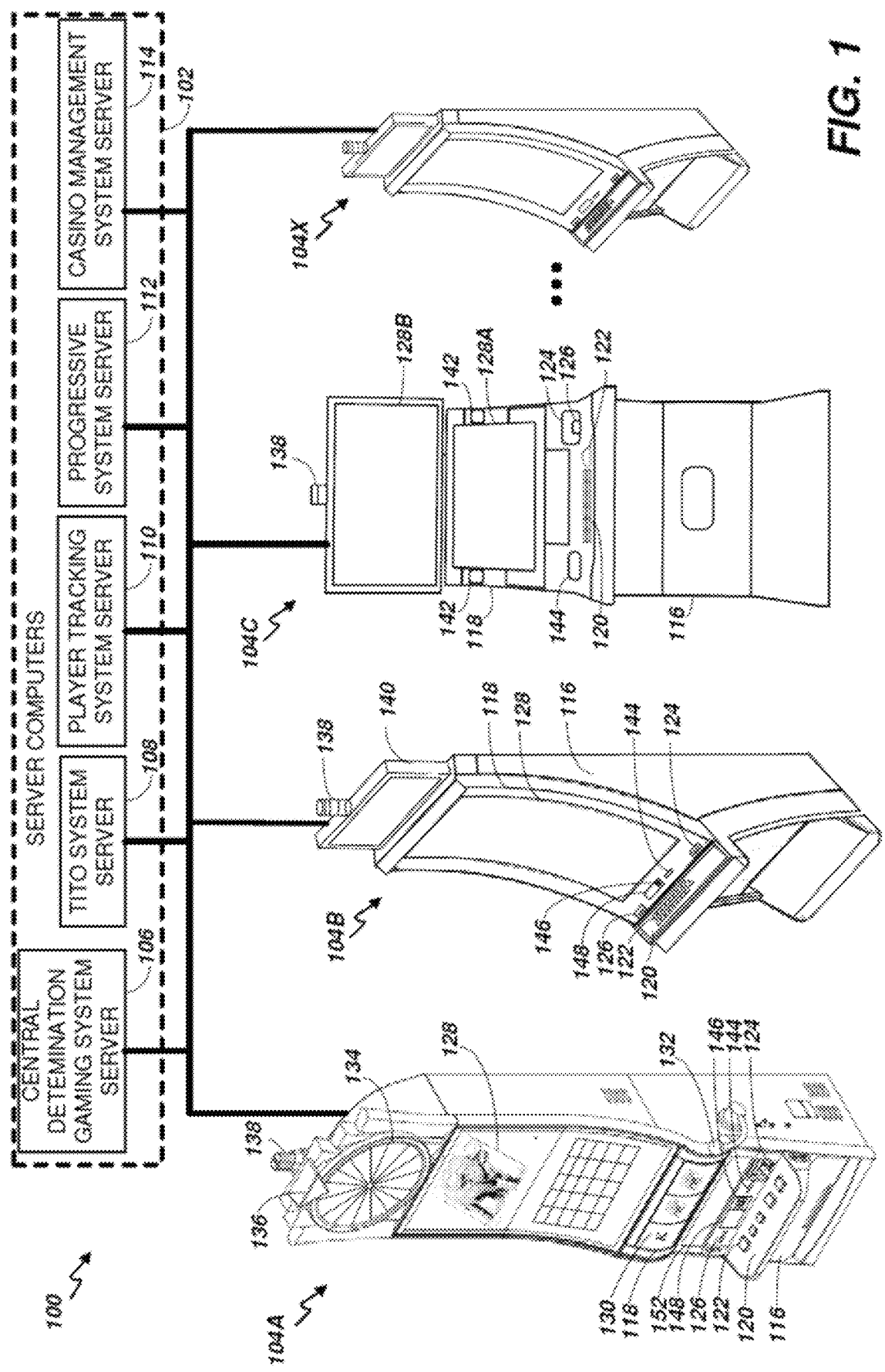
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
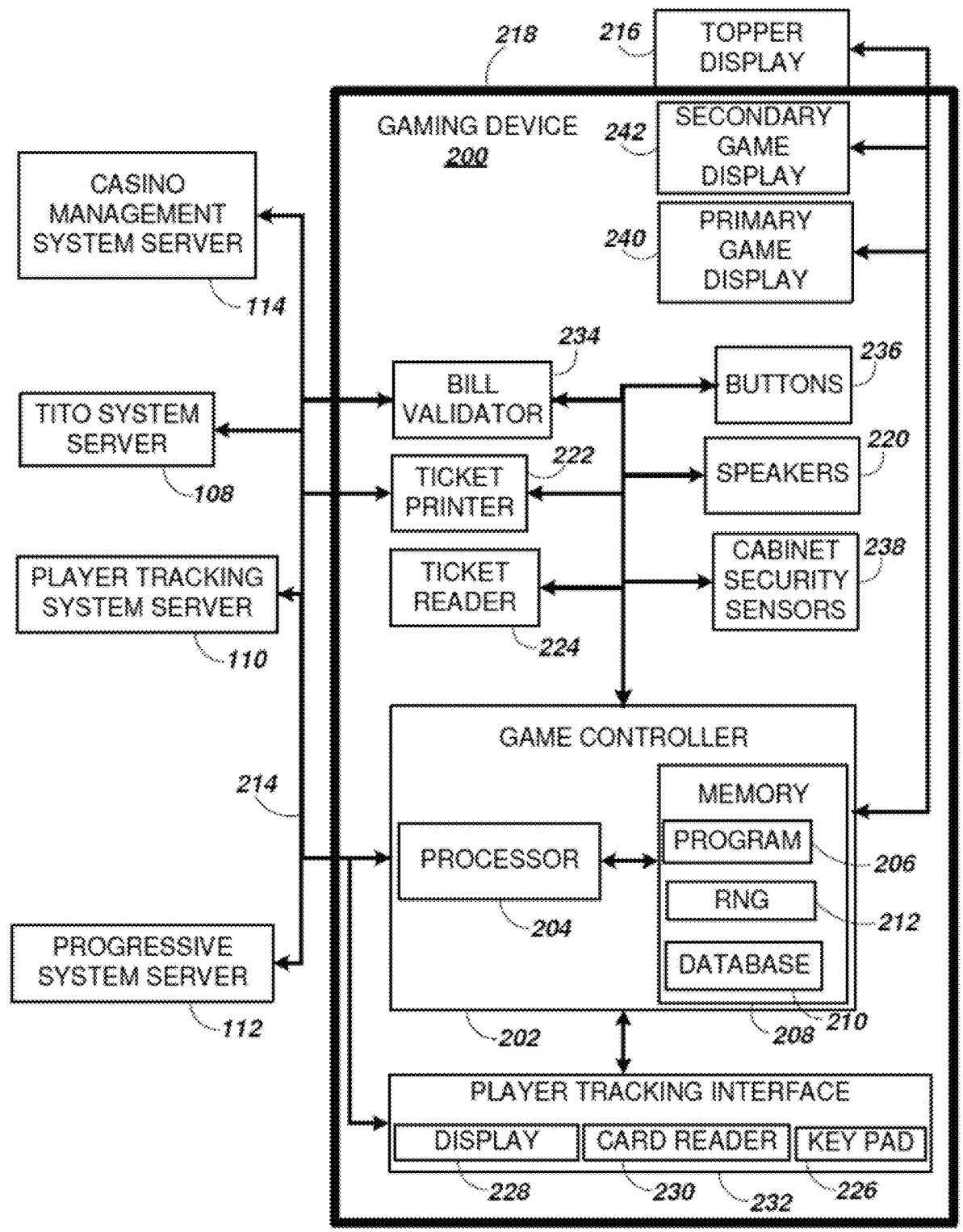
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines. Selecting a number of pay lines to play is only one example of a player selection. In another example employed in the embodiment described below, the player selects a number of reels to play as well as a number of reels to be activated for an additional feature.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
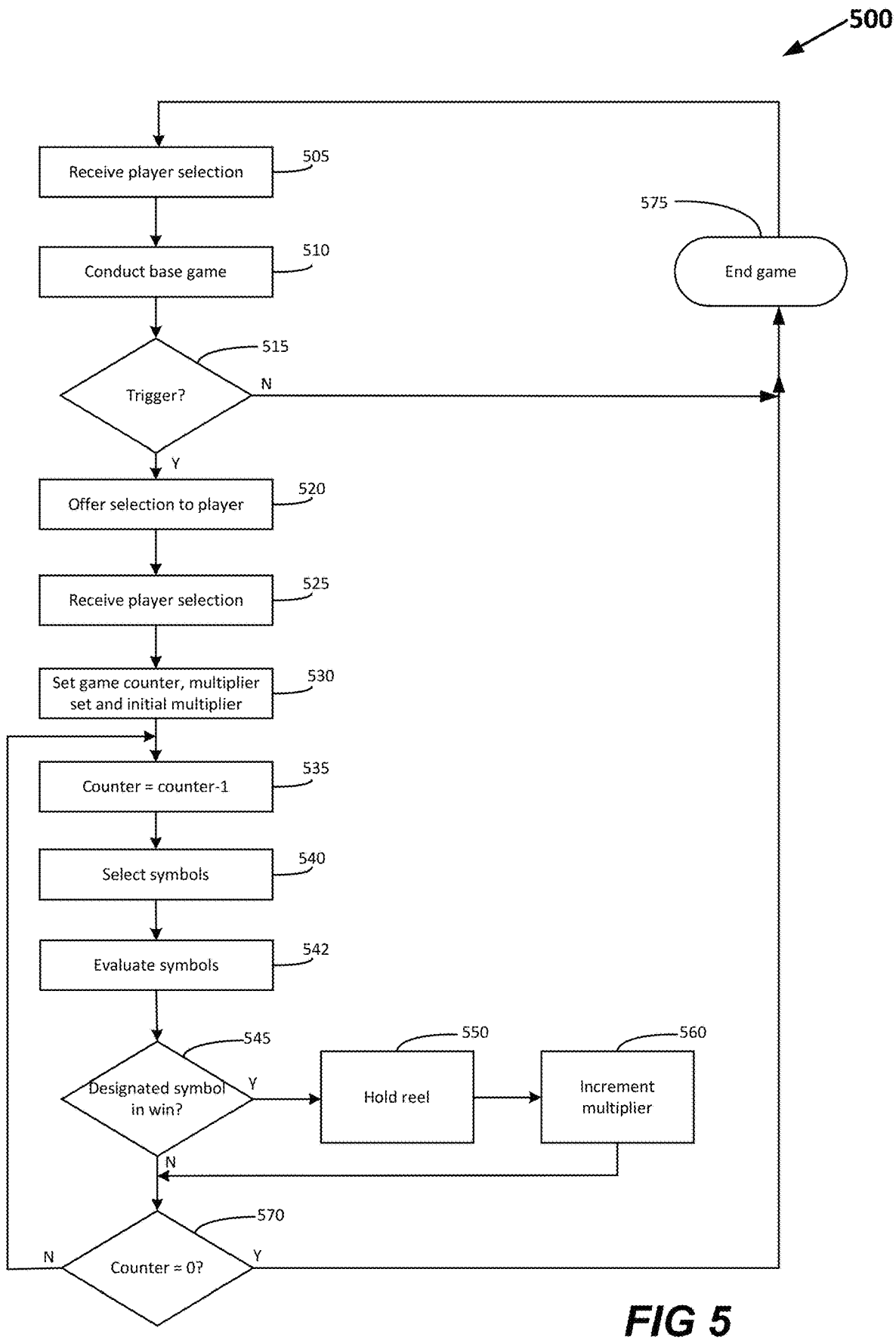
FIG. 5 is a flow chart of a method of operating a gaming machine.

FIG. 5 is a flowchart of a method 500 of operating a gaming device. At step 505, the processor 204 receives a player selection in respect of play of the game offered by the gaming device that the player has input via an input device such as buttons 236. For example, a number of pay lines to play.

In one example, the game is a spinning reel game conducted with five spinning reels where three symbols are selected for each reel for display in a rectangular array of symbol positions.

Figure 3:
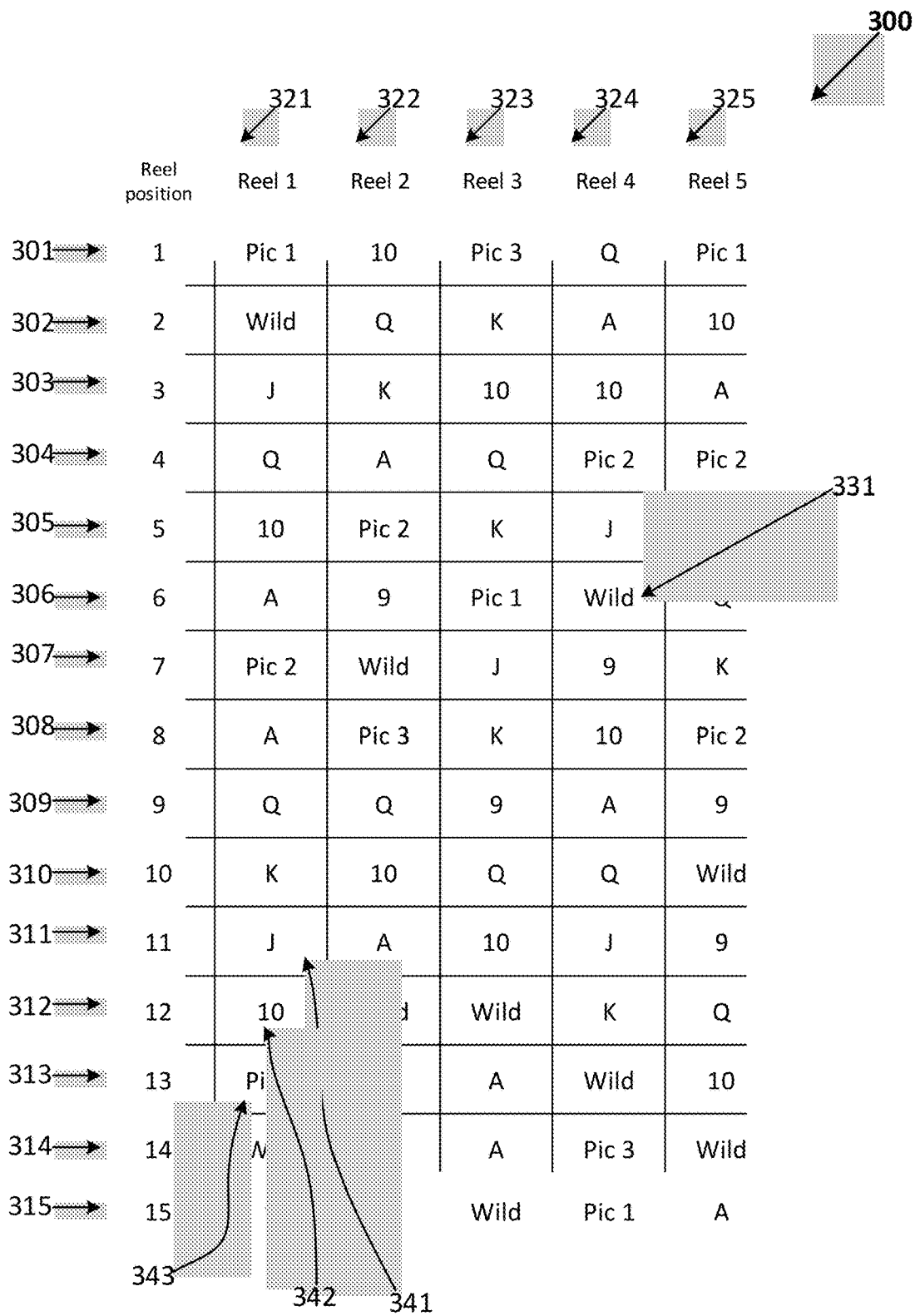
FIG. 3 illustrates an example reel strip layout.

At step 510, the processor 204 conducts a base game of the game by selecting symbols for the base game. FIG. 3 illustrates an example of a set 300 of five reel strips 321, 322, 323, 324, 325. In the example, each reel strip has fifteen reel strip positions 301-315. Each reel strip position of each reel has a symbol. For example, a "WILD" symbol 331 occupies the sixth reel strip position 306 of the fourth reel 324. Other reels strips to those illustrated in FIG. 3 can be used, for example, reel strips where two or more WILD symbols are placed at consecutive reel strip positions of a reel strip. In other examples, the reel strips could have between 30 and 100 reel strip positions. The actual length of the feature game reel strips would depend on factors such as the number of WILD symbols (in general, the more WILDs there are, the longer the reel strip needs to be to maintain the target RTP), and volatility (in general, the higher the prize value is, the longer the reel strip needs to be to lower the hit rate to maintain the target RTP).

Figure 4:
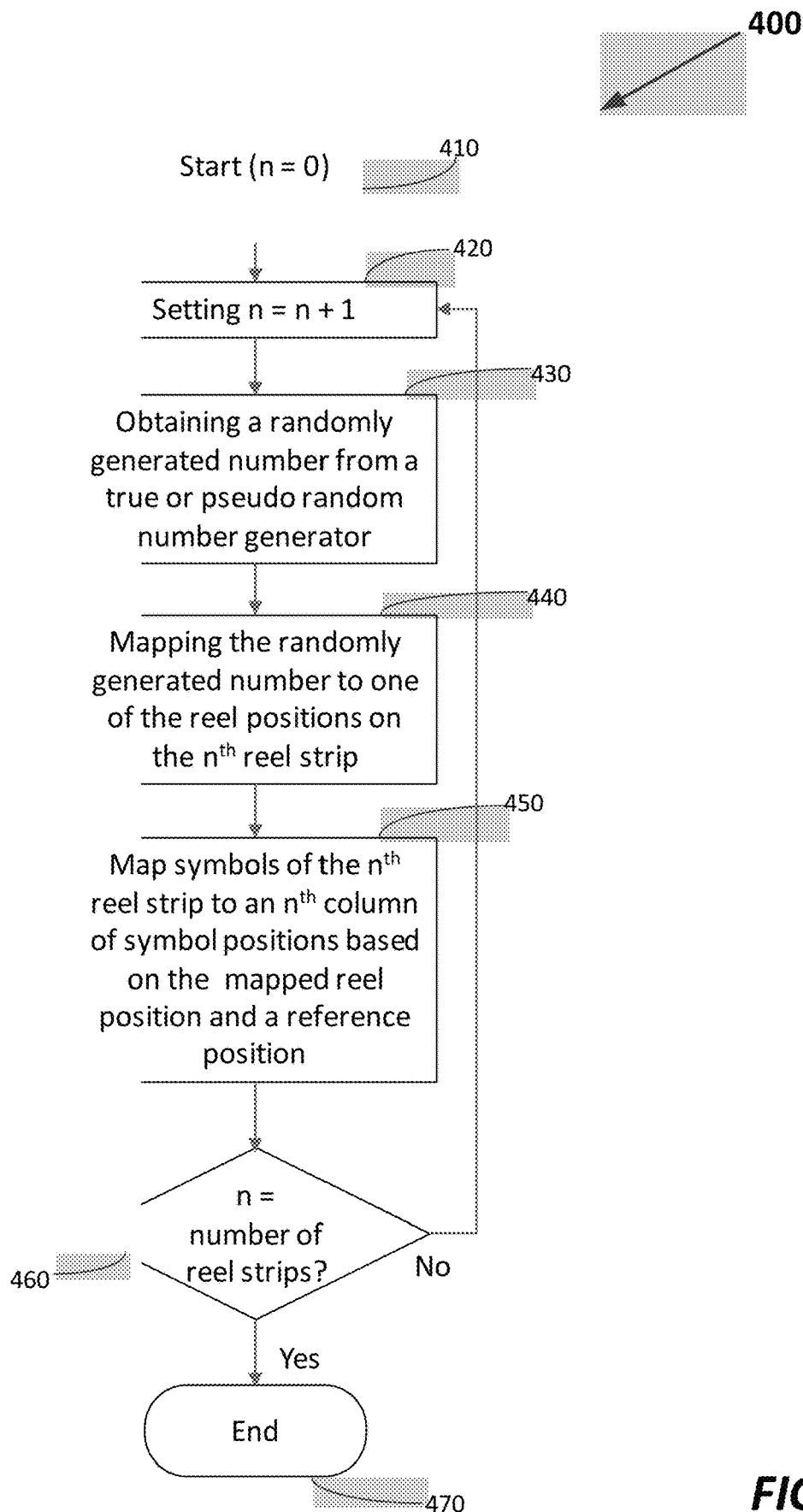
FIG. 4 is a flow chart of a symbol selection method.

FIG. 4 is a flow chart of an example of a method 400 that can be carried out by the processor 204 to select symbols from reel strips at step 510. At step 410, the processor 204 starts the process of selecting symbols with a counter (n) set at zero as symbols have not yet been selected from any reel strips. At step 420, the processor 204 increments the counter. In the first iteration, the counter is incremented to 1 to reflect that symbols are to be selected from a first reel strip. At step 430 the processor obtains a randomly generated number from a true or pseudo random number generator 212. At step 440 the processor maps the generated number to one of the reel positions of the $n^{th}$ reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 3, if the value returned by the RNG 212 is mapped to reel position 313, then for the first reel strip 321, "Pic3" symbol 343 is mapped to a bottom symbol position, "10" symbol 342 is mapped to a middle symbol position, and "J" symbol is mapped to a top symbol position.

At step 460, the processor 206 determines whether symbols have been selected for all of the reel strips, and if not the processor reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions.

The processor 204 evaluates the symbols at the symbol positions based on the player selections and a pay table in memory 208 to determine whether there are any winning combinations of symbols and the quantum of the award for any winning combination. The processor adds any award to a win meter in memory 208.

At step 515, the processor 204 also evaluates the symbols to determine whether a trigger condition is met. In an embodiment, the trigger is three or more scatter symbols being selected for the symbol positions. Other trigger mechanisms known in the art may also be used such as the applicant's HYPERLINK™ trigger. If a trigger condition is not met, the processor ends the game 575.

Upon a trigger condition being met, a feature game is initiated by the processor 204 in which a series of free game instances are conducted—i.e. additional game instances are generated and evaluated without a player making a further wager. In the embodiment, winning combinations are evaluated based on the same paylines the player selected for play of the game at step 505.

In the embodiment, a player is offered a selection at step 520 that affects the number of free game instances that are conducted. In other embodiments, the number of free game instances may be fixed or dependent on the number of scatter symbols in the trigger. In embodiments of the invention, winning combinations with one or more WILD symbols (a symbol that can substitute for others in a winning combination) attract a multiplier.

In one example, the selectable options are displayed as selectable icons on a touch screen of display 240. The player can select from:

20 free games where wins with WILD substituting have x2, x3 or x5 multiplier applied.
15 free games where wins with WILD substituting have x3, x5 or x8 multiplier applied.
10 free games where wins with WILD substituting have x5, x8 or x10 multiplier applied.
8 free games where wins with WILD substituting have x8, x10 or x15 multiplier applied.
5 free games where wins with WILD substituting have x10, x15 or x30 multiplier applied.

In some examples, the WILD symbol may have a different visual appearance depending on the selected option to assist the player in recalling which option has been selected.

At step 525, the processor 204 receives a player selection. In some examples, if a player does not select an option in time, the processor selects one of the options using RNG 212 or selects a default option.

At step 530, the processor 204 sets, in memory 208, a game instance counter based on the player's selection. The processor also sets the lowest value of the set of multipliers associated with the selected option as the initial multiplier. For example, if the player selects the 5 game option, the initial multiplier that will apply to a win with WILD substituting will the x10 multiplier and the game instance counter is set to 5.

At step 535, the processor 204 decrements the game instance counter by 1.

At step 540, the processor selects symbols from a symbol set stored in memory 208 for each symbol position not occupied by a previously held symbol. In the example, in the first game instance, no symbol is held. In one example, the symbol set is the set of reel strips used in the base game. In another example, a different set of reel strips are used. In either case, symbols are selected by the processor using the method described in relation to FIGS. 3 and 4.

At step 542, the processor 204 evaluates the selected symbols for any winning combinations based on the pay table. If any winning combinations included the WILD symbol, a multiplier is applied to the amount in the winning combination. Any awards are added to win meter in memory 208.

At step 545, the processor determines whether the symbols of any winning combination included a designated symbol, in this example, the WILD symbol. Upon, the selected symbols including a WILD symbol, the processor 204 updates memory to indicate that the WILD symbol will be held in place for all subsequent game instances of the series of game instance at step 550.

At step 560, the processor 204 updates the current multiplier to the next multiplier in the set of multipliers. For example, based on the selection above, the processor changes the current multiplier to x15. This multiplier will then be applied to the next game round. In other embodiments, the multiplier is updated before the selected symbols are evaluated except the first time a WILD symbol is selected.

At step 570, the processor determines whether the game instance counter has reached zero—i.e. all of the game instances have been selected. If they have, the processor 204 ends 575 the game.

If there are further game instances are to be conducted, the processor 204 reverts to step 535.

As described above, if a WILD symbol forms part of win, it is held in place by the processor for each subsequent game instance. In one example, the processor achieves this by holding in place the all the symbols of the column in which the WILD symbol was selected by updating memory 208 to indicate that symbols should not be selected for this column in subsequent game instances of the series of game instances. Accordingly, where at step 540 one or more columns are already populated by held symbols, the processor 204 only selects symbols from the reel strips corresponding to symbol positions not populated by held symbols (again using the technique of FIGS. 3 and 4).

In another example, the processor 204 only holds the WILD symbol in place and selects new symbols for each of the other symbols for the other symbol positions. In this example, the processor 204 continues to select symbols for each of the columns of symbol positions but "overwrites" the symbol selected for a position occupied by a held WILD symbol with the held WILD symbol by not displaying the selected symbol. For example, if a WILD symbol is held at the middle symbol position of a column of three symbol positions, and the processor selects Ace, King and Ace symbols for the top, middle, and bottom symbol positions, then the Ace, WILD and Ace will be displayed at the symbol positions.

In an example, the designated symbol does not appear on at least one reel strip, for example, on the leftmost and right most reel strip so that new symbols will be selected from at least some reel strips in each game instance.

Further, once the multiplier reaches the largest multiplier in the set, the it is no longer incremented at step 50. For example, based on the above example, the x30 multiplier is the largest multiplier. In an example, where the number of reel strips and multipliers are the same, and symbols in a column for which a WILD has featured in a winning combination are held by the processor 204, once the largest multiplier has been reached all the reel strips that have designated symbols will be held and hence the number of designated symbols in a winning combination will be at a fixed maximum. For example, where three reel strips carry a WILD symbol and there are three possible multipliers, once three WILD symbols has been held, the a new WILD symbol cannot appear in a later winning combination.

In another example, the multiplier may be incremented in a different manner, for example, by a fixed amount (e.g. 1) or by a factor (e.g. x2) each time a designated symbol is held.

In view of the foregoing, one technical improvement embodied by the present wagering game is that players of the wagering game may perceive a certain sense of equity, investment, and accomplishment in the wagering game as progress is made through the series of incrementally increasing multipliers. For example, a player who selects an option to play twenty free games (as described above) may feel a sense of achievement as the multiplier increases from an initial value of "x2" to larger values of "x3" and "x5."

Likewise, as described below with respect to the "RE-SPIN WILD" feature of the present disclosure, another technical improvement is that players may perceive an additional level of advancement or achievement, in that additional respins may be added to a player's series of free games (e.g., from twenty free games to twenty-three free games) each time a RE-SPIN WILD symbol lands during the wagering game. For instance, as a player's number of free spins continues to increase, the player may (correctly) feel that his or her chances of reaching and maintaining a final (greatest) multiplier are improved as well.

Figure 6:
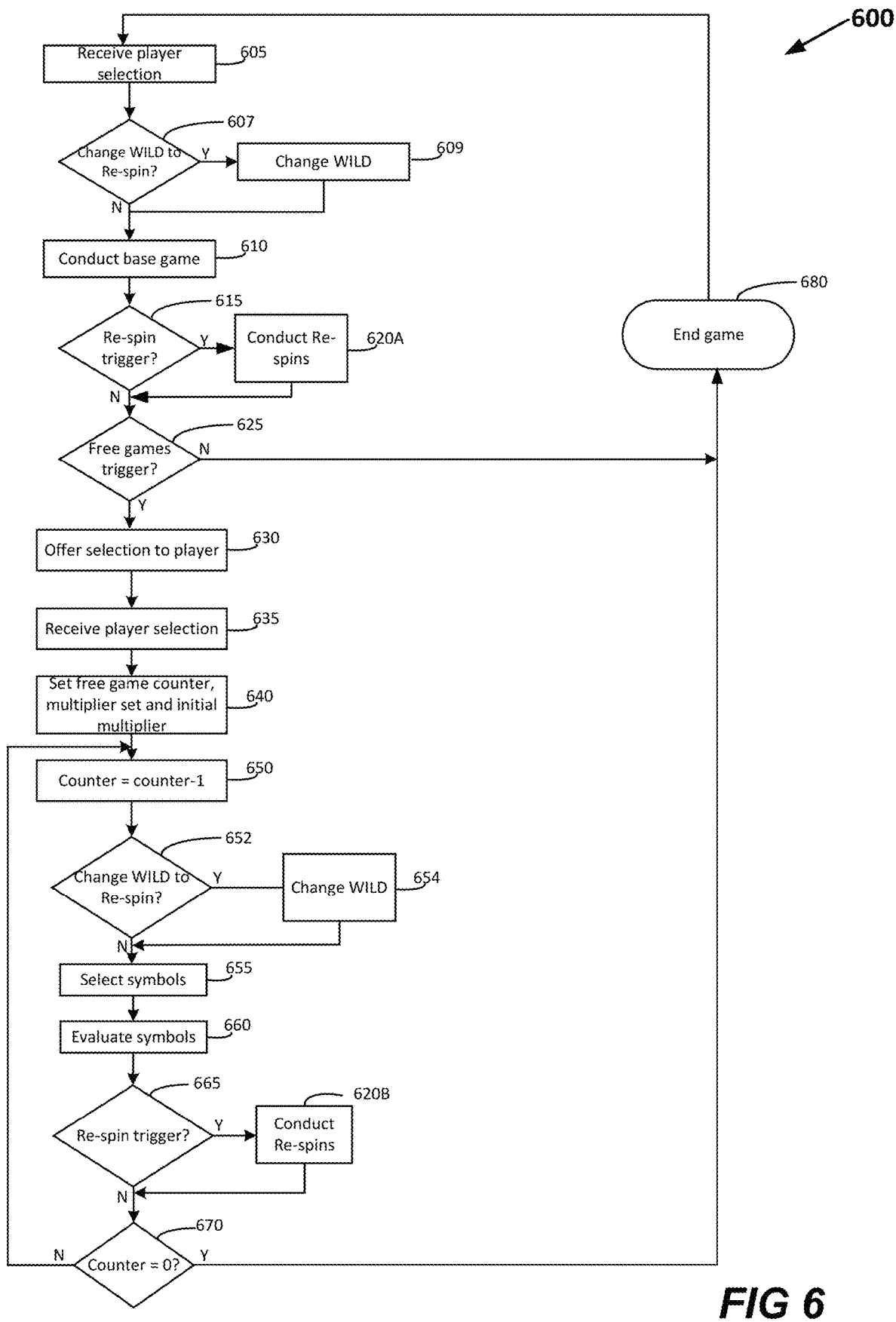
FIG. 6 is a flow chart of an exemplary method of operating a gaming device.

FIG. 6 is a flowchart of a method 600 of operating a gaming device 200 of another embodiment. At step 605, the processor 204 receives a player selection in respect of play of the game offered by the gaming device 200 that the player has input via an input device such as buttons 236. For example, a number of reels to play which will be used in an evaluation of the symbols as well as a bet multiplier. In one example, for each selected reel, all symbols of that reel can form part of a winning combination while for non-selected reels, only a defined symbol position can form part of the winning combination, in one example, the middle symbol position of each column. One example, of such an evaluation is marketed by the applicant under the name "Reel Power". In one example, there are no wager types including non-selected reels and the player can only chose between bet multipliers. In one example, a selection, for example, a maximum bet may results in a different type of evaluation, for example, a pay lien based evaluation.

In this example, the game is conducted with five spinning reels where three symbols are selected for each reel for display in a rectangular array of symbol positions. Accordingly, there are 243 ways to win if the player selects to play all reels.

Prior to conducting the base game in a manner similar to that described in relation to FIG. 5, at step 607, the processor 204 configures the reel strips to be used in the game by conducting a random determination using RNG 212 and a weighted table stored in memory 208 to determine whether the WILD symbols of the reel strips corresponding to the middle three columns of symbol positions should be changed to "RE-SPIN WILD" symbols.

Figure 8:
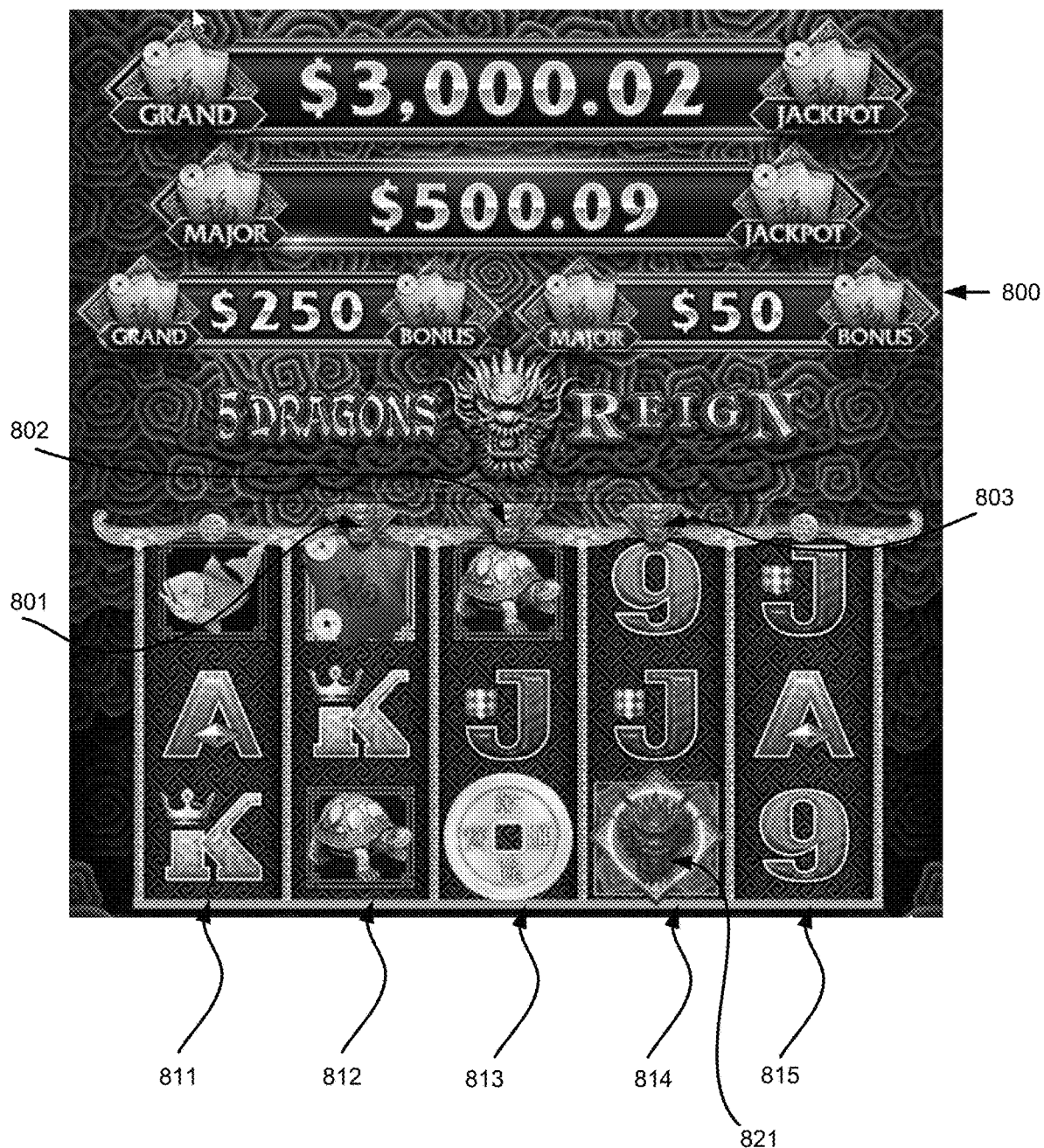
FIG. 8 is an exemplary reel display that may appear during electronic gaming.

FIG. 8 is an example screen display 800 showing an example of three symbols selected for each column 811-815 of symbol positions. FIG. 8 shows an example of an unchanged WILD symbol. In this example, the WILD is represented by as a green Dragon. Markers 801-803 indicate that the middle three columns 812-814 are the columns where the WILD symbol can be changed to RE-SPIN WILD.

In an example, weighted table defines the relative odds of the WILD symbols being changed by assigning part of the range that can be returned by RNG 212 to the outcome of changing the WILD symbols and the remainder of the range to not changing the WILD symbols. In an example, the weighted table stores different ranges in association with different wagers that the player can make as part of making a player selection. The processor 204 selects the relevant entry from the weighted table based on the player selections.

Figure 9:
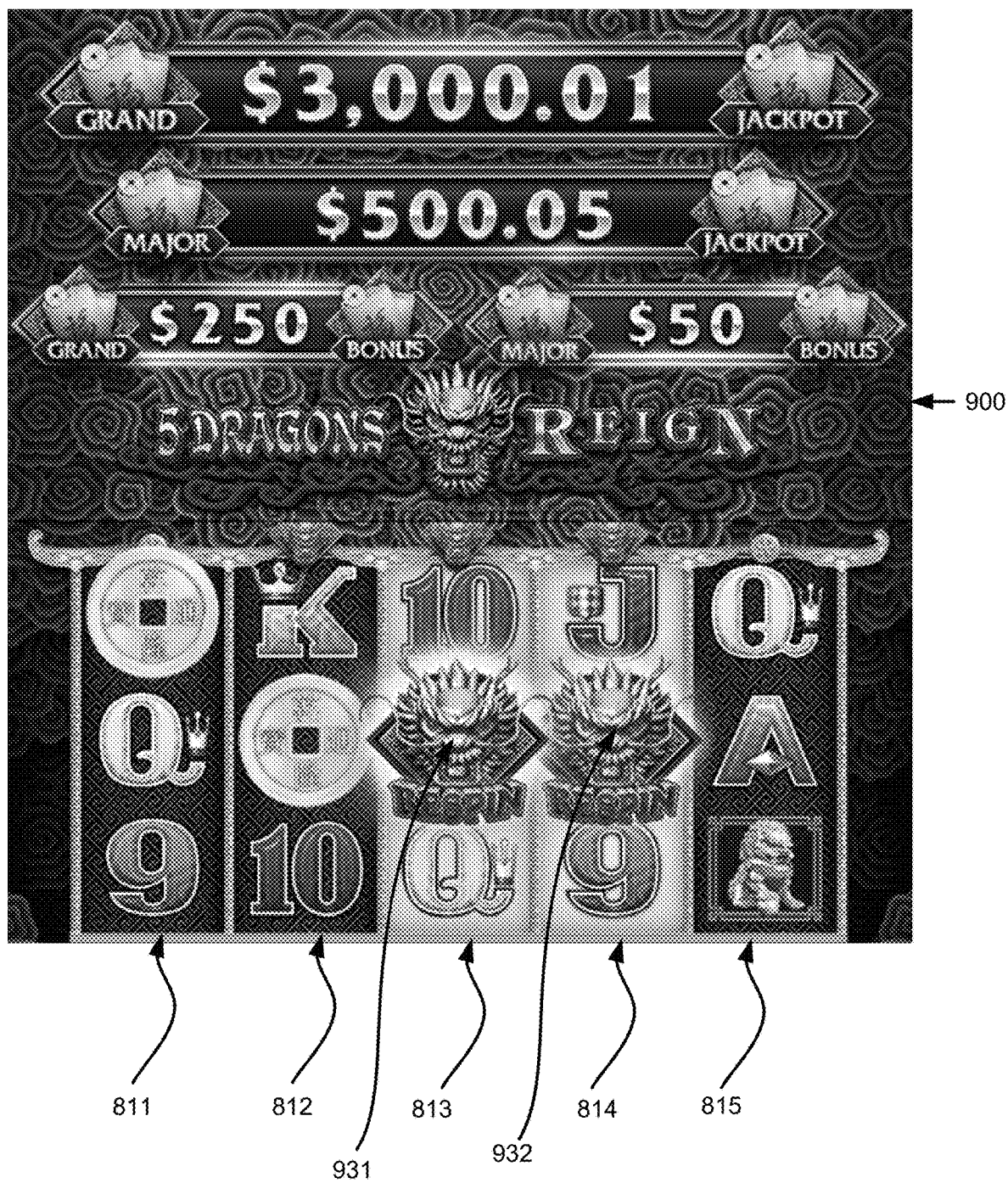
FIG. 9 is an exemplary reel display that may appear during electronic gaming.

If the outcome of step 607 is that the WILD symbols are to be changed, processor 204 changes the reel strips to incorporate "RE-SPIN WILD" symbols at step 609. FIG. 9 is an example screen display 800 showing two RE-SPIN WILD symbols 931,932. In this example, represented by a different representation of a Dragon and the word "RES-PIN".

At step 610, the processor 204 conducts a base game of the game by selecting symbols for the base game from the configured five reel strips using the same process described above in FIG. 4.

The processor 204 evaluates the symbols at the symbol positions based on the player selections and a pay table in memory 208 to determine whether there are any winning combinations of symbols and the quantum of the award for any winning combination. The processor adds any award to a win meter in memory 208.

At step 615, the processor 204 also evaluates the symbols to determine whether a re-spin feature is to be triggered. In this example, trigger condition for the re-spin feature is that the selected symbols include at least one RE-SPIN WILD symbol. Accordingly, in this example, the re-spin feature is only triggerable in games where the reel strips are configured to have the RE-SPIN WILD symbol. In other examples, the re-spin feature may be triggerable in all games.

Figure 7:
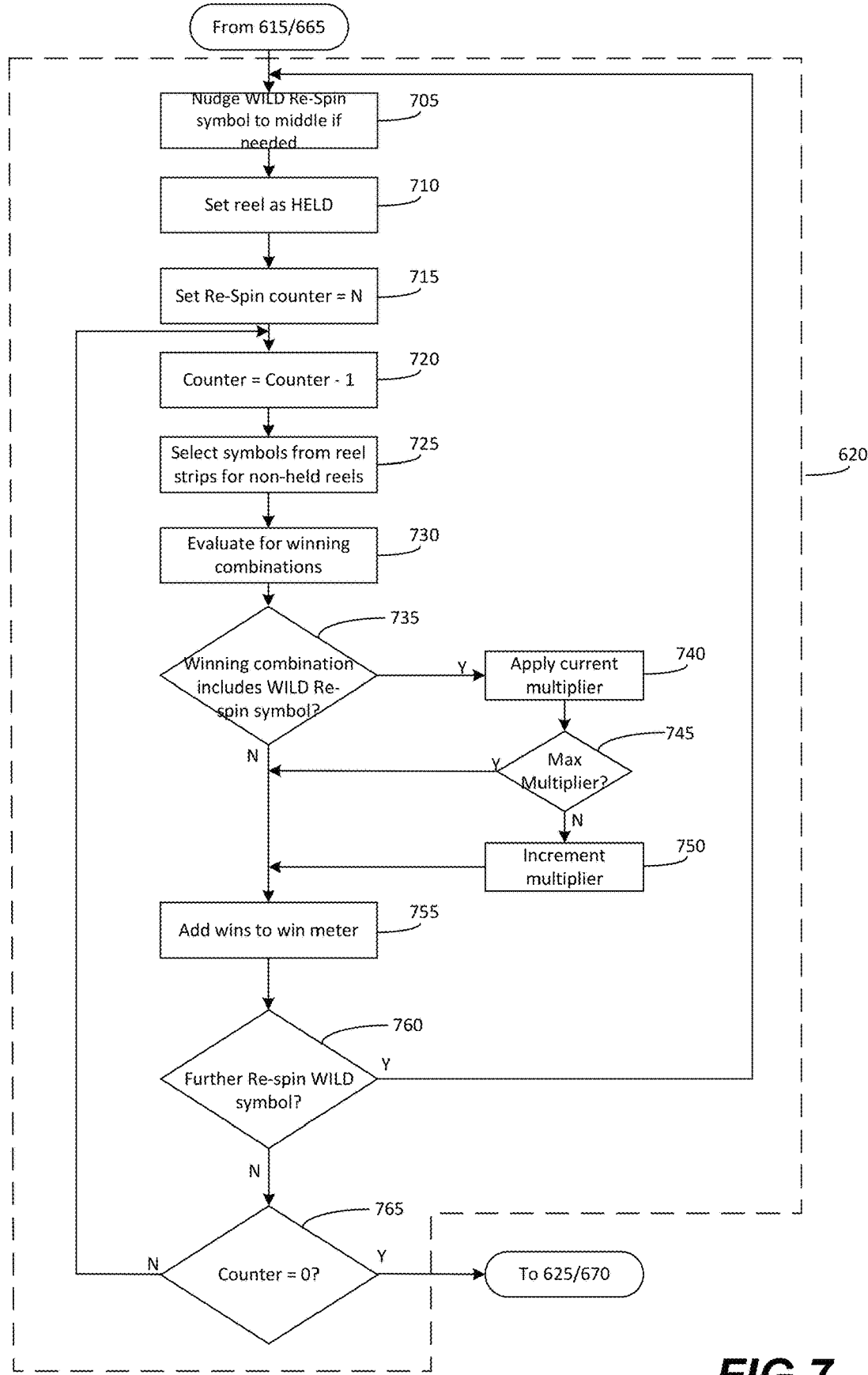
FIG. 7 is a flow chart of an exemplary method of a re-spin process during an electronic gaming process.

Upon the re-spin feature being triggered, processor 204 proceeds to step 620A and conducts the re-spins as described in more detail in FIG. 7. In this example, the re-spin feature can be triggered both from the base game and from the free games feature described below at step 620B. While the processor 204 returns to different steps after the conduct of these features and the multipliers that may be applied by processor 204 are from different pools of available multipliers, the processes carried out by processor 204 to conduct the re-spin features at steps 620A and 620B are otherwise the same and hence a common process is shown in FIG. 7.

As shown in FIG. 7, processor 204 enters step 620 either from step 615 or step 665 and this determines whether processing continues at step 625 or step 670 after the sub-steps 705-765 of the re-spin feature are conducted.

Figure 10:
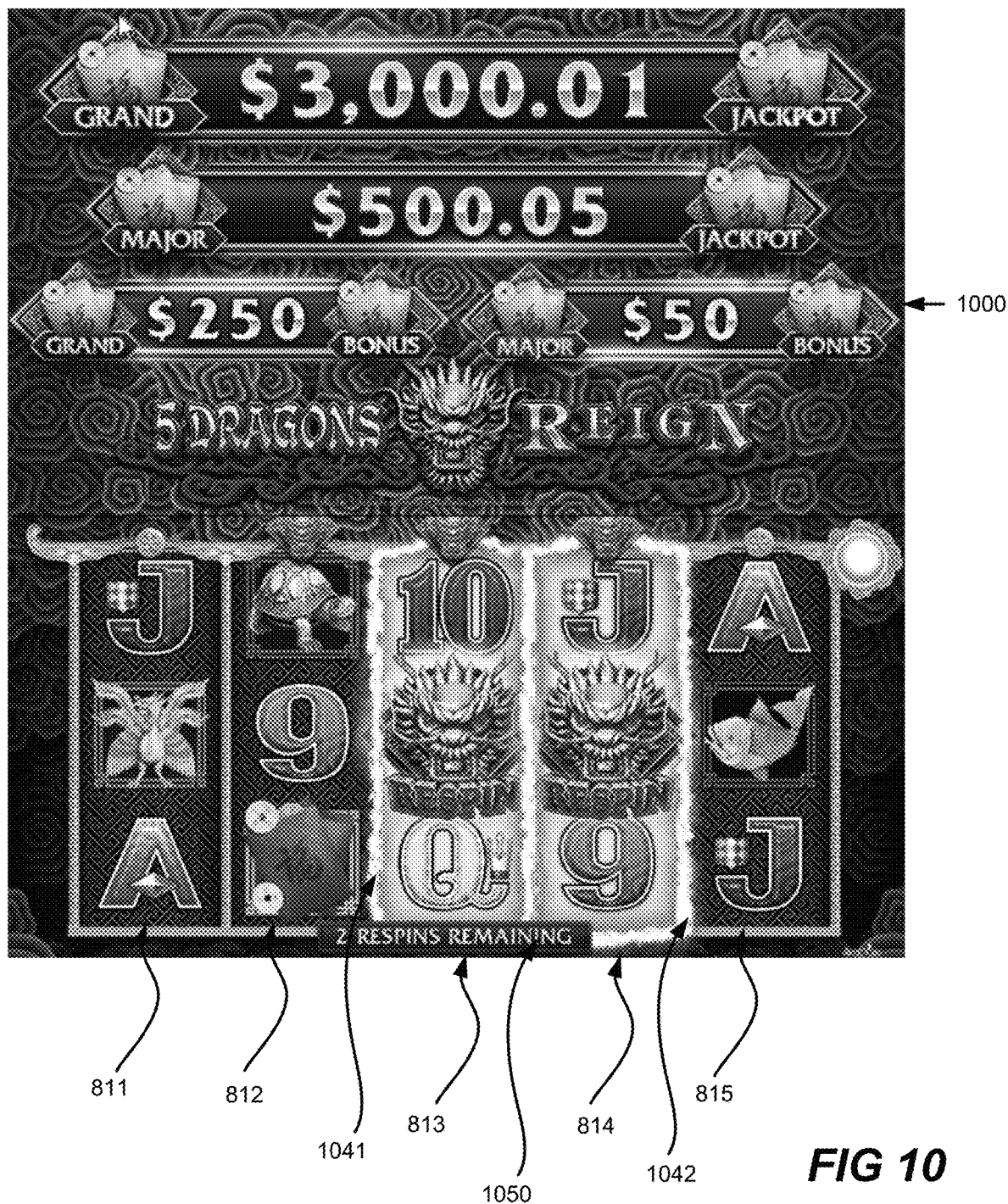
FIG. 10 is an exemplary reel display that may appear during electronic gaming.
Figure 11:
FIG. 11 is an exemplary reel display that may appear during electronic gaming.
Figure 12:
FIG. 12 is an exemplary reel display that may appear during electronic gaming.

At step 705, the processor 204 "nudges" (moves) each RE-SPIN WILD symbol to the middle position of the three symbol positions of the column in which it is selected if this is necessary. An example of this process is shown in FIGS. 10 and 11 where RE-SPIN WILD symbol 1033 lands at the top symbol position of the second column 812 as shown in FIG. 10 before being nudged to the middle position of the second column 812 as shown in FIG. 11.

It is also possible for the RE-SPIN WILD symbol to land on the middle position. FIG. 9 shows an example, where RE-SPIN WILD symbols 931,932 have landed in the middle symbol positions of third and fourth columns 813,814.

At step 710, the processor 204 sets each reel having a RE-SPIN WILD symbol as held. The effect of setting the reel as held is that the processor does not select symbols for that reel during the re-spins. To indicate to the player that the reels are held, an animated flame border is added around the relevant columns. For example, as shown in the screen display 1000 of FIG. 10, flame borders 1041, 1042 have been added around columns 813 and 814.

At step 715, the processor 204 sets a re-spin counter in memory 208 to a defined number of re-spins. In one example to three re-spins. A graphical representation of the counter is also added to the screen display. An example counter 1050 is shown in screen display 1000.

At step 720, the processor 204 commences the process of conducting the reel spins by decreasing the re-spin counter by one.

At step 725, the processor 204 selects symbol from the reel strips of each non-held reel. In this respect, the processor 204 employs a modified version of the process described in relation to FIG. 4 where, after incrementing the counter at step 420, processor 204 tests whether the value of the counter corresponds to a held reel strip and if it does reverts to step 420 rather than proceeding to step 430 to thereby skip over selecting symbols for the reels that are held.

At step 730, the processor 204 evaluates the symbols for winning combinations based on the pay table stored in memory and the player's selection. In this respect, the processor 204 iterates through all of the combinations of symbol positions defined by the player's selection, and evaluations these combinations from left to right to determine whether they include enough symbols to form a winning combination as defined by pay table, e.g. 3, 4 or 5 of the same symbol. As will be appreciated, such winning combinations can be completed by a RE-SPIN WILD symbol substituting in the winning combination.

At step 735, the processor 204 determines whether there are any winning combinations incorporating a RE-SPIN WILD symbol. And if so proceeds to step 740 of applying a current multiplier to the winning amount for the symbol combination. At step 745, the processor determines whether a maximum multiplier has been reached and if not increments the multiplier that will apply in any following re-spin at step 750. In this respect, in one example, an array defining the set multipliers is stored in memory 208 and provided there is a further multiplier in the array, processor 204 updates a pointer to the next multiplier in the array. If the last multiplier is reached, the pointer is not updated again until it is reset at the conclusion of the re-spin feature game. In one example, the multipliers are 2, 3, 5, 8, 10, 15, 30 and 40.

At step 755, processor adds each winning amount to a win meter in memory 208.

At step 760 the processor determines whether a further RE-SPIN WILD symbol was selected during this re-spin and if not, proceed to step 765 of determining whether the re-spin counter has reached zero—i.e. whether more re-spins are to be conducted. If there are remaining re-spins, processor 204 reverts to step 720. If there are no remaining re-spins processor 204 reverts to step 625 or 670 as appropriate.

If at step 760, there is a further RE-SPIN WILD symbol, processor 204 reverts to step 705 before conducting further re-spins and nudges the or each additional RE-SPIN WILD symbol to the middle symbol position. At step 710, the processor 204 sets the or each additional reel as held. At step 715, the processor sets the re-spin counter back to the initial value such that each additional RE-SPIN WILD symbol results in additional re-spins.

At step 625, the processor 204 evaluates the symbols to determine whether a trigger condition is met for a "Free games" feature. In an example, the free games are conducted only after any re-spin feature has been completed. In an embodiment, the trigger is three or more scatter symbols being selected for the symbol positions prior to any nudging of any RE-SPIN WILD symbols. Other trigger mechanisms known in the art may also be used such as the applicant's HYPERLINK™ trigger. If a trigger condition is not met, the processor ends the game 575.

Upon a trigger condition being met, the free games feature game is initiated by the processor 204 in which a series of free game instances are conducted—i.e. additional game instances are generated and evaluated without a player making a further wager. In the embodiment, winning combinations are evaluated based on the same selections received at step 505.

In the embodiment, a player is offered a selection at step 630 that affects the number of free game instances that are conducted In one example, the selectable options are displayed as selectable icons on a touch screen of display 240 and each selectable option is associated with a different coloured dragon WILD symbol to assist the player in recalling which option has been selected.

In one example, the player can select from:
20 free games where wins during any re-spins with WILD substituting have x2, x3 or x5 multiplier applied.
15 free games where wins during any re-spins with WILD substituting have x3, x5 or x8 multiplier applied.
10 free games where wins during any re-spins with WILD substituting have x5, x8 or x10 multiplier applied.
8 free games where wins during any re-spins with WILD substituting have x8, x10 or x15 multiplier applied.
5 free games where wins during any re-spins with WILD substituting have x10, x15 or x30 multiplier applied.
3 free games where wins during any re-spins with WILD substituting have x15, x30 or x40 multiplier applied, At step 635, the processor 204 receives a player selection. In some examples, if a player does not select an option in time, the processor selects one of the options using RNG 212 or selects a default option.

At step 640, the processor 204 sets, in memory 208, a game instance counter based on the player's selection. The processor also sets the lowest value of the set of multipliers associated with the selected option as the initial multiplier to be applied during any re-spins. For example, if the player selects the 5 game option, the initial multiplier that will apply to a win during any re-spins with WILD substituting will the x10 multiplier and the game instance counter is set to 5.

At step 650, the processor 204 decrements the game instance counter by 1.

Prior to conducting each free game of the feature game, the processor 204 configures the reel strips to be used in the free game by conducting a random determination at step 652 using RNG 212 and a weighted table stored in memory 208 to determine whether the WILD symbols of the reel strips corresponding to the middle three columns of symbol positions should be changed to RE-SPIN WILD symbols at step 654. In this respect, the process at steps 652 and 654 may be the same as that described in relation to steps 607 and 609. In another example, the weighted table for determining whether to change the symbols to RE-SPIN WILD symbols may be related to the player's selection received at step 635.

At step 655, the processor 204 also evaluates the symbols to determine whether a re-spin feature is to be triggered. As in the base game, the trigger condition for the re-spin feature is that the selected symbols include at least one RE-SPIN WILD symbol. Accordingly, in this example, the re-spin feature is only triggerable in free games where the reel strips are configured to have the RE-SPIN WILD symbol.

Upon the re-spin feature being triggered, processor 204 proceeds to step 620B and conducts the re-spin feature as described in more detail in FIG. 7. In this respect, as indicated above when triggered from the feature game, the set of multipliers that applies and can be incremented during the re-spin feature corresponds to the player's selection. Thus, if the player has selected the five free games the multiplier will initially be a x10 multiplier but can increment to x15 or x30 based on the as a result of steps 730 to 750 being carried out by processor 204. As the x30 multiplier is the maximum multiplier, the multiplier can only be incremented twice at step 750.

After the re-spin feature 620B has been completed, processing returns to step 570, the processor determines whether the game instance counter has reached zero—i.e. all of the game instances have been selected. If they have, the processor 204 ends 680 the game.

If there are further game instances are to be conducted, the processor 204 reverts to step 535.

In alternative examples, the re-spin feature may only available in the base game or only available in the base game for certain bet types such as a maximum bet.

An example embodiment provides a gaming device comprising:
- a display;
- a processor; and
- a memory storing a) a set of symbols including at least one designated symbol, and b) instructions which when executed by the processor, cause the processor to initiate a series of game instances, and in each game instance:
  - display a plurality of columns of symbol positions;
  - select symbols from the set of symbols for each symbol position not occupied by a previously held symbol;
  - control the display to display the selected symbols and any previously held symbols;
  - upon the selected symbols including a designated symbol, hold the designated symbol in place at a respective symbol position for any subsequent game instance of the series, and increment a multiplier to apply to evaluation of winning combinations provided a maximum multiplier has not been reached;
  - evaluate the displayed symbols for winning combinations; and
  - determining a quantum of each award for a winning combination in accordance the current multiplier.

In an example embodiment, the set of symbols comprises a plurality of reel strips that correspond to respective ones of the plurality of columns of symbol positions.

In an example embodiment, when the instructions are executed by the processor, they cause the processor to select symbols for each symbol position not occupied by a previously held symbol by selecting stopping positions for each of the plurality of reel strips.

In an example embodiment, when the instructions are executed by the processor, they cause the processor to hold all symbols of a column of symbol positions in place upon the column of selected symbol positions including a selected designated symbol.

In an example embodiment, when the instructions are executed by the processor, they cause the processor to the processor to receive an initial player selection, conduct a base game instance, and initiate the series of game instances responsive to a trigger condition being met in respect of the base game instance.

In an example embodiment, prior to initiating the series of game instances, the gaming device receives a selection from among a plurality of player selectable options, each option defining a number of game instances, an initial multiplier and at least one higher multiplier.

In an example embodiment, when the instructions are executed by the processor, they cause the processor to increment the multiplier by a defined factor.

In an example embodiment, when the instructions are executed by the processor, they cause the processor to increment the multiplier by a defined amount.

In an example embodiment, when the instructions are executed by the processor, they cause the processor to increment the multiplier to a next multiplier of a defined series of multipliers.

In an example embodiment, only a subset of the reel strips include the designated symbol.

In an example embodiment, there are five columns of symbol positions and five reel strips, and the reel strips corresponding to the middle three columns of symbol positions include the designated symbol.

In another example embodiment, there is provided a method of operating a gaming device comprising a display, the method comprising:
- initiating a series of game instances, and in each game instance:
  - displaying a plurality of columns of symbol positions on a display of the gaming device;
  - selecting symbols from the set of symbols for each symbol position not occupied by a previously held symbol;
  - controlling the display to display the selected symbols and any previously held symbols;
  - upon the selected symbols including a designated symbol, holding the designated symbol in place at a respective symbol position for any subsequent game instance of the series, and incrementing a multiplier to apply to evaluation of winning combinations provided a maximum multiplier has not been reached;
  - evaluating the displayed symbols for winning combinations; and
  - determining a quantum of each award for a winning combination in accordance the current multiplier.

In an example embodiment, the designated symbol is a wild symbol that substitutes of other symbols in winning combinations.

In an example embodiment, the set of symbols comprises a plurality of reel strips that correspond to respective ones of the plurality of columns of symbol positions.

In an example embodiment, selecting symbols for each symbol position not occupied by a previously held symbol comprises selecting stopping positions for each of the plurality of reel strips.

In an example embodiment, holding all symbols of a column of symbol positions in place upon the column of selected symbol positions including a selected designated symbol.

In an example embodiment, the method comprises receiving an initial player selection, conducting a base game instance, and initiating the series of game instances responsive to a trigger condition being met in respect of the base game instance.

In an example embodiment, the method comprises receiving a selection from among a plurality of player selectable options prior to initiating the series of game instances, each option defining a number of game instances, an initial multiplier and at least one higher multiplier.

In an example embodiment, the method comprises incrementing the multiplier by a defined factor.

In an example embodiment, the method comprises incrementing the multiplier by a defined amount.

In an example embodiment, the method comprises incrementing the multiplier to a next multiplier of a defined series of multipliers.

In an example embodiment, only a subset of the reel strips include the designated symbol.

In an example embodiment, there are five columns of symbol positions and five reel strips, and the reel strips corresponding to the middle three columns of symbol positions include the designated symbol.

In an example embodiment, the designated symbol is a wild symbol that substitutes of other symbols in winning combinations.

In another example embodiment, there is provided a gaming system comprising:

a display;
one or more processors; and
at least one memory storing instructions which when executed by the one or more processors, cause the one or more processors to initiate a series of game instances, and in each game instance:
display a plurality of columns of symbol positions;
select symbols from the set of symbols for each symbol position not occupied by a previously held symbol;
control the display to display the selected symbols and any previously held symbols;
upon the selected symbols including a designated symbol, hold the designated symbol in place at a respective symbol position for any subsequent game instance of the series, and increment a multiplier to apply to evaluation of winning combinations provided a maximum multiplier has not been reached;
evaluate the displayed symbols for winning combinations; and
determining a quantum of each award for a winning combination in accordance the current multiplier.

Another example embodiment provides computer program code which when executed implements the above method.

Another example embodiment provides a non-transitory computer readable medium comprising the computer program.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising:
a display device configured to provide graphical display output;
an input device configured to receive selection input during game play;
a memory storing a first set of reel strips; and
a processor configured to execute instructions stored in the memory, which when executed, cause the processor to at least:
initiate a first play on the electronic gaming machine based on an input from the input device, the first play using the first set of reel strips;
determine to activate a feature during the first play based on an output of a random number generator (RNG);
modify the first set of reel strips stored in the memory by replacing at least one reel strip of the first set of reel strips with a replaced reel strip resulting in a modified set of reel strips for at least the first play, the replaced reel strip includes one or more trigger symbols;
evaluate the first play using the modified set of reel strips to determine a first spin outcome;
control the display device to display the first spin outcome for the first play using the modified set of reel strips, the first spin outcome including a first trigger symbol on a first reel strip; and
in response to the first spin outcome including the first trigger symbol:
provide a quantity of free plays with the modified set of reel strips after evaluation of the first spin outcome of the first play; and
control the display device to hold the first trigger symbol in place during the free plays.

2. The electronic gaming machine of claim 1, wherein the instructions further cause the processor to:
access an ordered set of multiplier values applicable to outcomes using the modified set of reel strips;
configure a first multiplier value of the ordered set of multiplier values as a current multiplier value to be applied to outcome evaluation during a second play of the game; and
increase the current multiplier value to a next higher multiplier value when a subsequent free spin results in another trigger symbol appearing in an outcome of the subsequent free spin.

3. The electronic gaming machine of claim 2, wherein the instructions further cause the processor to:
control the display device to display a second spin outcome for the second play using the modified set of reel strips, the second spin outcome including a second trigger symbol on a second reel strip;
in response to the second spin outcome including the second trigger symbol, advance the current multiplier value to the next multiplier value in the ordered set of multiplier values; and
provide a third play of the game as a free play of the modified set of reel strips after evaluation of a spin outcome of the second play, applying the current multiplier value to outcome evaluation during the third play of the game.

4. The electronic gaming machine of claim 2, wherein controlling the display device to hold the first trigger symbol in play during the second play includes controlling the display device to hold the first reel strip in place during the second play.

5. The electronic gaming machine of claim 2, wherein controlling the display device to hold the first trigger symbol in play during the second play includes controlling the display device to shift the first reel strip by at least one position to center the first trigger symbol during the second play.

6. The electronic gaming machine of claim 2, wherein the instructions, when executed, further cause the processor to at least:
determine that at least one additional trigger symbol appears in a second spin outcome during the second play; and
in response to determining that at least one additional trigger symbol appears in the second spin outcome, provide at least one additional free play.

7. The electronic gaming machine of claim 2, wherein the instructions, when executed, further cause the processor to at least replace the modified set of reel strips with the first set of reel strips after determining that a second spin outcome for the second play includes no additional trigger symbols.

8. A tangible, non-transitory, computer-readable storage medium having instructions stored thereon, which when executed by a processor in communication with a memory storing a first set of reel strips, cause the processor to at least:
initiate a first play of an electronic game based on an input from an input device the first play using the first set of reel strips;
determine to activate a feature during the first play based on an output of a random number generator (RNG);
modify the first set of reel strips stored in the memory by replacing at least one reel strip of the first set of reel strips with a replaced reel strip resulting in a modified set of reel strips for at least the first play, the replaced reel strip includes one or more trigger symbols;

evaluate the first play using the modified set of reel strips to determine a first spin outcome;

control a display device to display the first spin outcome for the first play using the modified set of reel strips, the first spin outcome including a trigger wilds symbol on a first reel strip; and in response to the first spin outcome including the first trigger symbol:

provide a quantity of free plays with the modified set of reel strips after evaluation of the first spin outcome of the first play; and control the display device to hold the first trigger symbol in place during the free plays.

9. The tangible, non-transitory, computer-readable storage medium of claim 8, wherein the instructions, when executed, further cause the processor to at least:

access an ordered set of multiplier values applicable to outcomes using the modified set of reel strips;

configure a first multiplier value of the ordered set of multiplier values as a current multiplier value to be applied to outcome evaluation during a second play of the game; and increase the current multiplier value to a next higher multiplier value when a subsequent free spin results in another trigger symbol appearing in an outcome of the subsequent free spin.

10. The tangible, non-transitory, computer-readable storage medium of claim 9, wherein the instructions, when executed, further cause the processor to at least:

control the display device to display a second spin outcome for the second play using the modified set of reel strips, the second spin outcome including a second trigger symbol on a second reel strip;

in response to the second spin outcome including the second trigger symbol, advance the current multiplier value to the next multiplier value in the ordered set of multiplier values; and provide a third play of the game as a free play of the modified set of reel strips after evaluation of a spin outcome of the second play, applying the current multiplier value to outcome evaluation during the third play of the game.

11. The tangible, non-transitory, computer-readable storage medium of claim 9, wherein controlling the display device to hold the first trigger symbol in play during the second play includes controlling the display device to hold the first reel strip in place during the second play.

12. The tangible, non-transitory, computer-readable storage medium of claim 9, wherein controlling the display device to hold the first trigger symbol in play during the second play includes controlling the display device to shift the first reel strip by at least one position to center the first trigger symbol during the second play.

13. The tangible, non-transitory, computer-readable storage medium of claim 9, wherein the instructions, when executed, further cause the processor to at least:

determine that at least one additional trigger symbol appears in a second spin outcome during the second play; and in response to determining that at least one additional trigger symbol appears in the second spin outcome, provide at least one additional free play.

14. The tangible, non-transitory, computer-readable storage medium of claim 9, wherein the instructions, when executed, further cause the processor to at least replace the modified set of reel strips with the first set of reel strips after determining that a second spin outcome for the second play includes no additional trigger symbols.

15. A method comprising:

initiating a first play of an electronic game based on an input from an input device, the first play using a first set of reel strips;

determining to activate a feature during the first play based on an output of a random number generator (RNG);

modify the first set of reel strips stored in a memory by replacing at least one reel strip of the first set of reel strips with a replaced reel strip resulting in a modified set of reel strips for at least the first play, the replaced reel strip includes one or more trigger symbols;

evaluate the first play using the modified set of reel strips to determine a first spin outcome;

controlling a display device to display the first spin outcome for the first play using the modified set of reel strips, the first spin outcome including a first trigger symbol on a first reel strip; and in response to the first spin outcome including the first trigger symbol:

providing a quantity of free plays with the modified set of reel strips after evaluation of the first spin outcome of the first play; and controlling the display device to hold the first trigger symbol in place during the free plays.

16. The method of claim 15 further comprising:

accessing an ordered set of multiplier values applicable to outcomes using the modified set of reel strips;

configuring a first multiplier value of the ordered set of multiplier values as a current multiplier value to be applied to outcome evaluation during a second play of the game; and increasing the current multiplier value to a next higher multiplier value when a subsequent free spin results in another trigger symbol appearing in an outcome of the subsequent free spin.

17. The method of claim 16 further comprising:

controlling the display device to display a second spin outcome for the second play using the modified set of reel strips, the second spin outcome including a second trigger symbol on a second reel strip;

in response to the second spin outcome including the second trigger symbol, advancing the current multiplier value to the next multiplier value in the ordered set of multiplier values; and provide a third play of the game as a free play of the modified set of reel strips after evaluation of a spin outcome of the second play, applying the current multiplier value to outcome evaluation during the third play of the game.

18. The method of claim 16, wherein controlling the display device to hold the first trigger symbol in play during the second play includes controlling the display device to hold the first reel strip in place during the second play.

19. The method of claim 16, wherein controlling the display device to hold the first trigger symbol in play during the second play includes controlling the display device to shift the first reel strip by at least one position to center the first trigger symbol during the second play.

20. The method of claim 16 further comprising:

determining that at least one additional trigger symbol appears in a second spin outcome during the second play; and in response to determining that at least one additional trigger symbol appears in the second spin outcome, providing at least one additional free play.

\* \* \* \* \*